(12) United States Patent
Patibandla et al.

(10) Patent No.: US 12,015,955 B2
(45) Date of Patent: Jun. 18, 2024

(54) DEVICE, SYSTEM, AND METHOD FOR SWITCHING BETWEEN A NARROWBAND NETWORK AND A BROADBAND NETWORK

(71) Applicant: MOTOROLA SOLUTIONS, INC., Chicago, IL (US)

(72) Inventors: Badarinath Patibandla, Chicago, IL (US); Daniel P. Zetzl, Chicago, IL (US); David J. Ley, Chicago, IL (US); Mohd Faisal Abdullah, Penang (MY)

(73) Assignee: MOTOROLA SOLUTIONS, INC., Chicago, IL (US)

(*) Notice: Subject to any disclaimer, the term of this patent is extended or adjusted under 35 U.S.C. 154(b) by 329 days.

(21) Appl. No.: 17/555,872

(22) Filed: Dec. 20, 2021

(65) Prior Publication Data
US 2023/0199573 A1 Jun. 22, 2023

(51) Int. Cl.
H04W 36/00 (2009.01)
H04W 36/14 (2009.01)
H04W 36/24 (2009.01)

(52) U.S. Cl.
CPC ....... *H04W 36/0022* (2013.01); *H04W 36/14* (2013.01); *H04W 36/24* (2013.01)

(58) Field of Classification Search
CPC . H04W 36/0022; H04W 36/14; H04W 36/24; H04W 36/36; H04W 48/06; H04W 88/06
See application file for complete search history.

(56) References Cited

U.S. PATENT DOCUMENTS

| | | | |
|---|---|---|---|
| 10,257,882 B2 | 4/2019 | Cushing | |
| 11,051,138 B1 | 6/2021 | McDonald et al. | |
| 11,096,120 B1 | 8/2021 | Martinovich et al. | |
| 2004/0224719 A1* | 11/2004 | Nounin | H04W 36/12 455/552.1 |

(Continued)

FOREIGN PATENT DOCUMENTS

| | | |
|---|---|---|
| CN | 100352219 C | 11/2007 |
| WO | WO-2013090317 A1 | 6/2013 |

OTHER PUBLICATIONS

PCT/US2022/052213, Device, System, and Method for Switching Between a Narrowband Network and a Broadband Network, Dec. 8, 2022.

*Primary Examiner* — Nguyen T Vo
(74) *Attorney, Agent, or Firm* — PERRY + CURRIER, INC.

(57) ABSTRACT

A device, system, and method for switching between a narrowband network and a broadband network is provided. A radio device determines conditions of a broadband network and receives, from a narrowband network site, access criteria indicating that a subset of a plurality of radio devices can register with the narrowband network site to communicate on a narrowband network. In response to the conditions meeting one or more given conditions and receiving the access criteria, when the radio device is communicating on the broadband network, the radio device may continue communicating on the broadband network; or when the radio device is communicating on the narrowband network, or attempting to register with the narrowband network site, the radio device switches, from communicating on the narrowband network, or attempting to register with the narrowband network site, to communicating on the broadband network.

20 Claims, 4 Drawing Sheets

(56) References Cited

U.S. PATENT DOCUMENTS

| | | | |
|---|---|---|---|
| 2006/0135143 A1* | 6/2006 | Suematsu | H04W 88/06 455/445 |
| 2010/0197223 A1* | 8/2010 | Saito | H04W 84/047 455/23 |
| 2011/0021195 A1 | 1/2011 | Cormier et al. | |
| 2015/0312781 A1 | 10/2015 | Chowdhary et al. | |
| 2021/0267013 A1 | 8/2021 | Chen et al. | |
| 2021/0314739 A1 | 10/2021 | Martinovich et al. | |

* cited by examiner

DEVICE, SYSTEM, AND METHOD FOR SWITCHING BETWEEN A NARROWBAND NETWORK AND A BROADBAND NETWORK

BACKGROUND OF THE INVENTION

Radio devices of first responders, and the like, may be configured to communicate on both narrowband networks and broadband networks. However, switching between such networks may be problematic when certain conditions occur on the networks.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
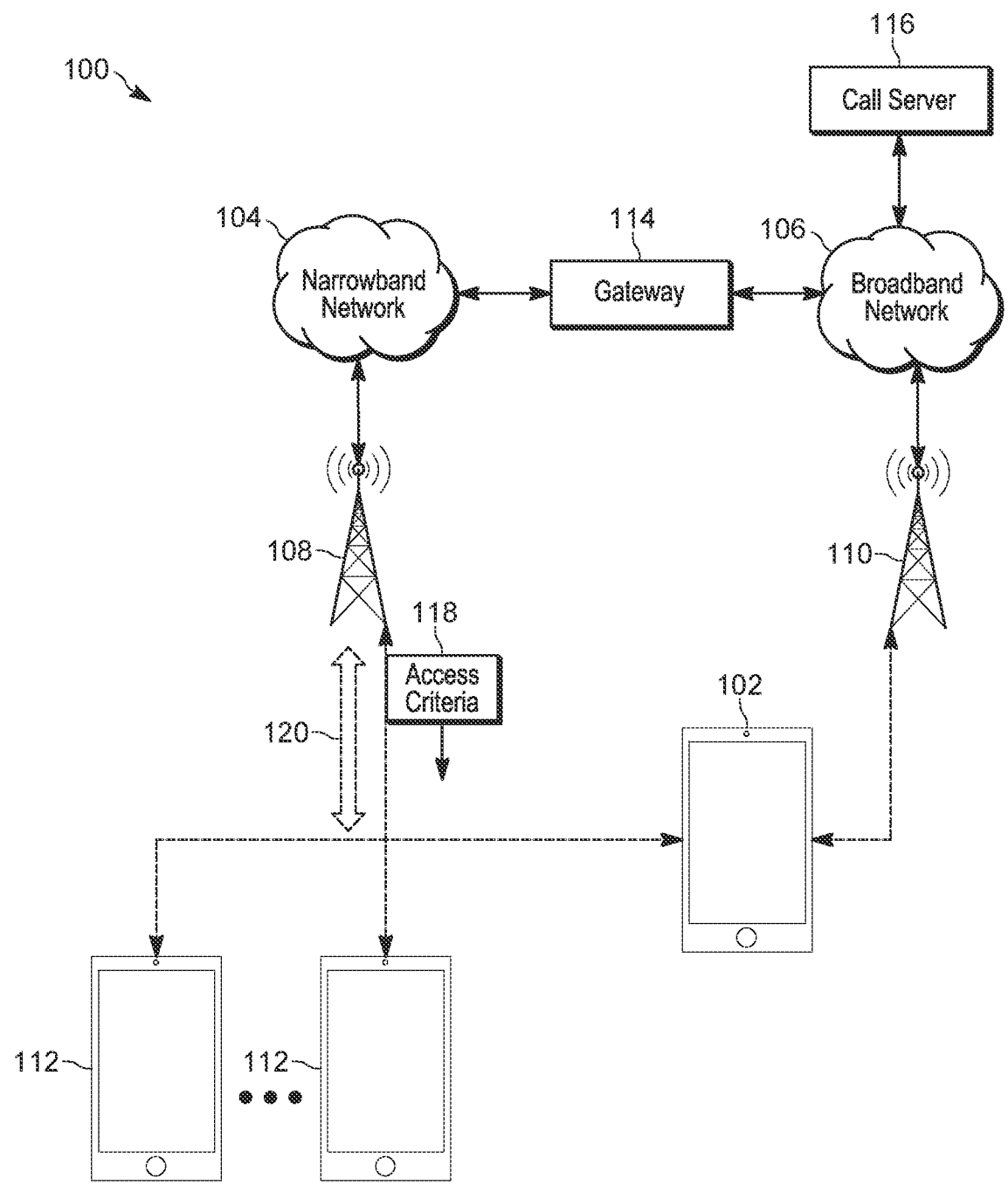
FIG. 1 is a system for switching between a narrowband network and a broadband network, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Radio devices of first responders, and the like, may be configured to communicate on both narrowband networks and broadband networks. However, switching between such networks may be problematic when certain conditions occur on the networks. In particular, automatic roaming between narrowband networks and broadband networks may cause temporary lapses in communication when, for example, there are certain types of congestion at one or more of the networks, that may not be easily detectable at the radio devices. Thus, there exists a need for an improved technical method, device, and system for switching between a narrowband network and a broadband network.

Hence, provided herein is a device, system, and method for switching between a narrowband network and a broadband network. For example, a radio device of a first responder, and the like, may be configured to communicate on a narrowband network (e.g., such as a digital mobile radio network, a land mobile radio network, and the like) and a broadband network (e.g., such as a cell phone network, an LTE (long term evolution) network, a 5G network, and a WiFi network, and the like. The radio device may initially be communicating on the narrowband network or the broadband network. When communicating on the narrowband network, the radio device may need to change from a narrowband network site to a broadband network site to continue communicating, or, when communicating on the broadband network, the radio device may switch to the narrowband network, when available. In particular, the narrowband network may be generally dedicated to radio devices of first responders whereas the broadband network may be for any radio devices, among other possibilities.

A radio device, as provided herein may determine that a broadband network has sufficient signal strength (e.g., above a given signal strength threshold that may be RSRP (Reference Signal Received Power) based for LTE and/or 5G networks and/or a Received Signal Strength Indicator (RSSI) based for WiFi networks), and/or the broadband network meets any other suitable conditions, for example based on RSRQ (Reference Signal Received Quality) among other possibilities. The radio device may further receive, from a narrowband network site of a narrowband network, access criteria indicating that a subset of a plurality of radio devices, the plurality of radio devices including the radio device, can register with the narrowband network site to communicate on the narrowband network.

Such access criteria may be received under a number of scenarios. For example, such access criteria may be received from a narrowband network site when the radio device is to switch from one narrowband network site to the narrowband network site from which the access criteria is received (e.g., the radio device is initially communicating on the narrowband network).

Alternatively, such access criteria may be received when the radio device is initially communicating on the broadband network, and may be in a coverage area of the narrowband network site transmitting the access criteria In yet another example, a radio device may be communicating at a narrowband network site which may transmit the access criteria to indicate that a subset of radio devices, that recently attempted to register with the narrowband network site, may register with the narrowband network site. In such an example, such radio devices may have attempted to register with the narrowband network site after being powered on and/or when entering a coverage area of the narrowband network site. In such an example, the subset of the radio devices may attempt to register with the narrowband network site within short a duration of time, which may and cause congestion.

In a similar example, a plurality of radio devices may attempt to reregister with the narrowband network site, again causing the access criteria to be transmitted.

However, it is understood that the access criteria may be received at a provided radio device under any suitable circumstances.

Furthermore, it is understood that the access criteria is generally indicative that congestion may occur at the narrowband network site that is transmitting the access criteria, when a subset of a plurality of radio devices indicated by the access criteria all try to register with the narrowband network site in response to receiving the access criteria. As such, rather than communicate on the narrowband network site, the radio device provided herein is configured to: when the radio device is already communicating on the broadband network, continuing communicating on the broadband network; and when the radio device is communicating on the narrowband network, either currently, or by attempting to register with the narrowband network site, switching from communicating on the narrowband network to communicating on the broadband network.

An aspect of the present specification provides a method comprising: determining, at a radio device, one or more conditions of a broadband network; receiving, at the radio device, from a narrowband network site of a narrowband network, access criteria indicating that a subset of a plurality of radio devices can register with the narrowband network site to communicate on the narrowband network; and in response to the one or more conditions of the broadband network meeting one or more given conditions and receiving the access criteria: when the radio device is communicating on the broadband network, continuing, at the radio device, communicating on the broadband network; or when the radio device is communicating on the narrowband network, or attempting to register with the narrowband network site, switching, at the radio device, from communicating on the narrowband network, or attempting to register with the narrowband network site, to communicating on the broadband network.

Another aspect of the present specification provides a radio device comprising: a communication unit configured to communicate over a narrowband network and a broadband network; and a controller configured to: determine one or more conditions of the broadband network; receive, via the communication unit, from a narrowband network site of the narrowband network, access criteria indicating that a subset of a plurality of radio devices can register with the narrowband network site to communicate on the narrowband network; and in response to the one or more conditions of the broadband network meeting one or more given conditions and receiving the access criteria: when the radio device is communicating on the broadband network, continue communicating on the broadband network via the communication unit; and when the radio device is communicating on the narrowband network, or attempting to register with the narrowband network site, switch from communicating on the narrowband network, or attempting to register with the narrowband network site, to communicating on the broadband network via the communication unit.

Each of the above-mentioned aspects will be discussed in more detail below, starting with example system and device architectures of the system in which the embodiments may be practiced, followed by an illustration of processing blocks for achieving an improved technical method, device, and system for switching between a narrowband network and a broadband network.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Attention is directed to FIG. 1, which depicts an example system 100 for switching between a narrowband network and a broadband network. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like.

The system 100 comprises a radio device 102, a narrowband network 104, a broadband network 106, a narrowband network site 108, and a broadband network site 110. As depicted, the system 100 further comprises a plurality of other radio devices 112, a gateway 114 between the networks 104, 106, and a call server 116 in communication with the broadband network 106. While not depicted the system 100 may further comprise a call server in communication with the narrowband network 104.

The radio device 102 is generally configured to communicate over both networks 104, 106, and may comprise any suitable communication device including, but not limited to a digital mobile radio (DMR), a land mobile radio (LMR), a two way radio, and the like, and/or any suitable communication device configured to communicate over both networks 104, 106.

The other radio devices 112 may be similar to, or different from, the radio device 102. In particular, the other radio devices 112 are configured to communicate over the narrowband network 104 and may be configured to communicate over the broadband network 106.

The narrowband network 104 may comprise one or more of a digital mobile radio network and a land mobile radio network, or any suitable narrowband network, and the like, including, but not limited to, a Project 25 (P25) network, a terrestrial trunked radio (TETRA) network, and the like. Hence, in some examples, the narrowband network 104 may be dedicated to communications for radio devices of first responders (e.g., as P25 networks and TETRA networks may generally comprise first responder dedicated narrowband networks).

In contrast, the broadband network 106 may comprise one or more of a cell phone network, an LTE (Long Term Evolution) network, a 5G network, a WiFi network, and the like. Hence, in some examples, the broadband network 106 may be available for communication to any suitable communications device, including communications operated by the general public.

Furthermore, it is understood that wireless communications with the narrowband network 104 may generally occur via the narrowband network site 108, which may comprise one or more antennas and a base station controller, and the like. The narrowband network site 108 may hence facilitate wireless communications between the radio device 102 and the narrowband network 104, as well as facilitate wireless communications between the other radio devices 112 and the narrowband network 104.

Similarly, it is understood that wireless communications with the broadband network 106 may generally occur via the broadband network site 110, which comprises one or more antennas and a base station controller, and the like. The broadband network site 110 may hence facilitate wireless communications between the radio device 102 and the broadband network 106, as well as facilitate wireless communications between the other radio devices 112 and the broadband network 106 when the other radio devices 112 are configured to communicate over the broadband network 106.

In general, the narrowband network 104 is understood to communicate over a narrower and/or smaller set of frequencies than the broadband network 106.

In one example of the narrowband network 104, a narrowband LMR wireless network may operate in either a conventional or trunked configuration. In either configuration, a plurality of radio devices is partitioned into separate groups of radio devices. However the narrowband network 104 may comprise any other suitable narrowband network, such as a so-called conventional narrowband network in which each radio device in a group is selected to a particular radio channel (frequency or frequency & time slot) for communications associated with that radio device's group. Thus, each group is served by one channel, and multiple groups may share the same single frequency or frequency & time slot (in which case, in some examples, group identifiers may be present in the group data to distinguish between groups).

In another example of the narrowband network 104, in a trunked narrowband network, radio devices use a pool of traffic channels for virtually an unlimited number of groups of radio devices (and which may also be referred to herein as talkgroups). Thus, all groups are served by all channels. The trunked radio network works to take advantage of the probability that not all groups need a traffic channel for communication at the same time. When a member of a group requests a call on a control or rest channel on which all of the radio devices at a site idle awaiting new call notifications, in one example, a call controller assigns a separate traffic channel for the requested group call, and all group members move from the assigned control or rest channel to the assigned traffic channel for the group call. In another example, when a member of a group requests a call on a control or rest channel, the call controller may convert the control or rest channel on which the radio devices were idling to a traffic channel for the call, and instruct all radio devices that are not participating in the new call to move to a newly assigned control or rest channel selected from the pool of available channels. With a given number of channels, a much greater number of groups may be accommodated in a trunked narrowband radio network as compared with a conventional narrowband radio network.

Hence, the narrowband network 104, and the narrowband network site 108, may be configured to communicate with the radio devices 102, 112 according to any of these narrowband configurations, or any other suitable configurations. Similarly, the radio devices 102, 112 may be configured to communicate via the narrowband network 104, and the narrowband network site 108 (and/or other narrowband network sites) via push-to-talk (PTT) protocols. Furthermore, control of PTT communications may occur via a control channel, which may be dedicated to the radio devices 102, 112 or may be a shared control channel (e.g., when bandwidth is limited in some regions and is hence shared by different networks).

However, the radio device 102, and optionally one or more of the radio devices 112, may be configured for PTT communications over the broadband network 106 via the broadband network site 110. For example, open mobile alliance (OMA) push to talk (PTT) over cellular (OMA-PoC) is one example of an infrastructure broadband wireless application, which enable PTT and "instant on" features of traditional half duplex radio devices, but uses radio devices operating over modern broadband telecommunications networks. Using OMA-PoC, wireless radio devices such as mobile telephones and notebook computers can function as PTT half-duplex radio devices for transmitting and receiving. Other types of PTT models and multimedia call models (MMCMs) are also available.

Floor control in an OMA-PoC session is generally maintained by a PTT server that controls communications between two or more wireless radio devices. Such functionality may be embodied at the system 100 by the call server 116. When a user of one of the radio devices 102, 112 (e.g., presuming the other radio devices 112 are configured to communicate over the broadband network 106) keys a PTT button, a request for permission to speak in the OMA-PoC session is transmitted from the user's radio device to the PTT server using, for example, a real-time transport protocol (RTP) message. If no other users are currently speaking (e.g., using their radio devices to speak) in the PoC session, an acceptance message is transmitted back to the user's radio device and the user may then speak into a microphone of the radio device. Using compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the auditory data packets to other users of the PoC session (e.g., to other radio devices in the group of radio devices or talkgroup to which the user is subscribed), using for example, one or more of a unicast, point to multipoint, or broadcast communication technique.

In some instances, as depicted, broadband and narrowband networks may be interfaced via a middleware system that translates between a narrowband PTT standard protocol (such as DMR, P25, and the like) and a broadband PTT standard protocol or application (such as OMA-PoC). Such intermediate middleware may include a middleware server for performing the translations and may be disposed in the cloud, disposed in a dedicated on-premises location for a client wishing to use both technologies, or disposed at a public carrier supporting one or both technologies. For example, and with respect to FIG. 1, such a middleware server may be disposed in the gateway 114.

The narrowband network site 108 may be generally configured to broadcast access criteria 118 indicating which of the radio devices 102, 112 may register with the narrowband network site 108 to communicate over the narrowband network 104.

For example, many, and/or all, of the radio devices 102, 112 may attempt to register with the narrowband network site 108 within a given time period, which may overwhelm the network and/or processing resources at the narrowband network site 108. Such attempts to register with the narrowband network site 108 may occur when the narrowband network site 108 turns on, and/or goes down and comes back on-line and/or when the radio devices 102, 112 are, through circumstance, within a coverage region served by the narrowband network site 108 at a same time.

In one particular example, the radio device 102 may be initially communicating with the broadband network 106 via the broadband network site 110, and attempt to register with the narrowband network site 108, for example at the same time, and/or within a given time period, that a plurality of the other radio devices 112 attempt to register with narrowband network site 108.

In another example, the radio device 102 may be initially communicating with the narrowband network 104 via another narrowband network site (not depicted), and attempt to switch communications from the other narrowband network site to the depicted narrowband network site 108, for example as the radio device 102 is moving (e.g., due to be being carried by a moving first responder, and the like). In this example, the radio device 102 may attempt to register with the narrowband network site 108, for example at the same time, and/or within a given time period, that a plurality of the other radio devices 112 attempt to register with narrowband network site 108.

In another example, the radio device 102 may initially turn on and may attempt to register with the narrowband network site 108, for example at the same time, and/or within a given time period, that a plurality of the other radio devices 112 attempt to register with narrowband network site 108.

In another example, the radio device 102 may already be communicating on the narrowband network site 108 (e.g., the radio device 102 has already registered with the narrowband network site 108), and a plurality of the other radio devices 112 may attempt to register with the narrowband network site 108, for example when a plurality of the other radio devices 112 turn on, and/or enter a coverage area of the narrowband network site 108. In some of these examples, the narrowband network site 108 may request that the radio device 102 reregister with the narrowband network site 108.

Regardless, in any of these examples, the narrowband network site 108 may detect a congestion condition and transmit the access criteria 118.

To indicate that the radio device 102 may be attempting to register with one of the narrowband network site 108, or may already communicating with one, or the other, of the networks 104, 106, wireless communication links between the sites 108, 110 and the radio device 102 are depicted as dashed lines. To indicate that the radio devices 112 may be attempting to register with the narrowband network site 108, wireless communication links between the narrowband network site 108 and the other radio devices 112 are depicted as dashed lines. However, for illustrative purposes, only a wireless communication link is from the broadband network site 110 to the radio device 102, and not the other radio devices 112 to indicate that, in the depicted example, the other radio devices 112 may be attempting to register with the narrowband network site 108 but not the broadband network site 110.

Furthermore, for illustrative purposes, an example control channel 120 is depicted in dashed lines in FIG. 1 on communication links between the narrowband network site 108 and the radio devices 102, 112 indicating that the control channel 120 may be present at any suitable time.

Regardless of the circumstances, the narrowband network site 108 may attempt to restrict which radio devices 102, 112 may register at any given time by broadcasting the access criteria 118 which may indicate that a subset of a plurality of radio devices 102, 112, the plurality of radio devices 102, 112 including the radio device 102, can register with the narrowband network site 108 to communicate on the narrowband network 104. For example, the access criteria 118 indicate that only radio devices 102, 112 that have respective identifiers that meet certain criteria may attempt to registers, such as only those radio devices 102, 112 that have an even numbered identifier (e.g., as opposed to an odd numbered identifier), and the like. However, the access criteria 118 may have any suitable format and/or may have any suitable indication of a subset of the radio devices 102, 112 that may register with the narrowband network site 108. Examples of such identifiers may include, but are not limited to, DMR device identifiers, LMR device identifiers, talkgroup identifiers, and the like, but may include any other suitable identifiers.

Furthermore, in one example of the access criteria 118, that is particular to a DMR protocol, access criteria 118 may comprise a mask value and mask size (e.g., how many bits in the mask value have to be matched starting from a least significant bit), and any radio device 102, 112 that have an associated identifier that matches the mask pattern, may register with the narrowband network site 108. In such examples, radio device identifiers may be provided in hex values, binary values, and the like. Similarly, a mask value may be provided in hex values, binary values, and the like. In one particular example, using binary values a mask value may comprise "0b 0000 0000 0000 0000 0000 0000" (e.g., a binary value) and a mask size may comprise "2 bits" which indicate that radio devices 102, 112 having an associated identifier having a last 2 bits of "00" in binary values may register with the narrowband network site 108; in particular, radio devices identifiers having a DMR device identifier that end in 4, 8, 12, 16, etc. (e.g., in base 10), are understood to have a last two bits as 00 in binary values.

Hence, in another particular example, a mask value may comprise "0b 0000 0000 0000 0000 0000 0001" (e.g., a binary value) and a mask size may comprise "2 bits" which indicate that radio devices 102, 112 having an associated identifier having a last 2 bits of "01" in binary values may register with the narrowband network site 108; in particular, radio devices identifiers having a DMR device identifier that end in 1, 3, 5, 7, etc. (e.g., in base 10), are understood to have a last two bits of 01 in binary values.

Hence, when the radio device 102 (e.g., an associated respective identifier thereof) meets the access criteria 118, the access criteria 118 may generally invite the radio device 102 to register with the narrowband network site 108.

The access criteria 118 being transmitted may be generally indicative that congestion may occur at the narrowband network site 108 as many of the other radio devices 112 that meet the access criteria 118 may attempt to register with the narrowband network site 108. In particular, the narrowband network site 108 may be is subdividing the radio devices 102, 112 that are attempting to register, or which may already be registered, at the narrowband network site 108, due to detected congestion or expected (e.g., forecast and/or predicted) congestion. Hence, it is understood that the narrowband network site 108 may generally be enabled to detect congestion, and/or to forecast and/or predict congestion, and transmit and/or broadcast the access criteria 118 accordingly, which may include, but is not limited to, inviting all radio devices already registered with the narrowband network site 108 to re-register. One example of conditions under which the access criteria 118 may be transmitted and/or broadcast is the narrowband network site 108 determining that a number of radio devices attempting to register with the narrowband network site 108 within a given time period being above a threshold number (e.g., such as 50, 100, or 200 radio devices attempting to register with 10 seconds, 20 seconds, 30 seconds, among other possibilities). During this congestion period, a response, by the narrowband network site 108, to a registration attempt by a radio device, such as the radio device 102, may be delayed; furthermore, when a radio device, such as the radio device 102 is already registered with narrowband network site 108, call requests by the radio device, to the narrowband network site 108, may not succeed due to collisions on an uplink to the narrowband network site 108.

Hence if the radio device 102 attempts to communicate on the narrowband network 104, or is already communicating on the narrowband network 104, via the narrowband network site 108 (e.g., when the radio device 102 meets the access criteria 118), delays in registering, or reregistering, with the narrowband network site 108 may occur, which may delay communications over the narrowband network 104.

Hence, in response to receiving the access criteria 118, when the radio device 102 is already communicating on the broadband network 106, the radio device 102 may decline to attempt to register with the narrowband network site 108, regardless of whether or not the radio device 102 meets the access criteria 118, and the radio device 102 may continue communicating on the broadband network 106.

Similarly, in response to receiving the access criteria 118, when the radio device 102 is communicating on the narrowband network 104, or is attempting to register with the narrowband network site 108, the radio device 102 may switch from communicating on the narrowband network 104, or attempting to register with the narrowband network site 108, to communicating on the broadband network 106, regardless of whether the radio device 102 meets the access criteria 118, and the radio device 102 may continue communicating on the broadband network 106.

However, the radio device 102 continuing to communicate over the broadband network 106 and/or switching to communicating over the broadband network 106, may occur further in response to conditions of the broadband network 106, as determined by the radio device 102, meeting given conditions.

For example, the radio device 102 may be generally configured to determine one or more certain conditions of the broadband network 106, such as signal strength, signal quality, among other possibilities, described in more detail below. In general, however, the one or more conditions of the broadband network 106 and the broadband network site 110, determined by the radio device 102, generally indicate whether, or not, the radio device 102 may communicate over the broadband network 106.

The radio device 102 may hence determine whether the one or more conditions of the broadband network 106 meet certain one or more given conditions indicative of the radio device 102 being able to communicate over the broadband network 106, such as a determined signal strength of the broadband network 106 being above a given signal strength threshold that has been preconfigured at the radio device 102 and/or a determined signal quality of the broadband network 106 being above a given signal quality threshold that has been preconfigured at the radio device 102.

For example, such a given signal strength threshold may be selected such that, when the signal strength of the broadband network 106 is above (or at) the given signal strength threshold, the broadband network 106 may be suitable for communications by the radio device 102 and, when the signal strength of the broadband network 106 is below the given signal strength threshold, the broadband network 106 may not be suitable for communications by the radio device 102. For LTE networks, and the like, one example of signal strength that may be determined is Reference Signal Received Power (RSRP), and a given RSRP threshold may be provided. For WiFi networks, and the like, one example of signal strength that may be determined is Received Signal Strength Indicator (RSSI), and a given RSSI threshold may be provided.

For example, such a given signal quality threshold may be selected such that, when the signal quality of the broadband network 106 is above (or at) the given signal quality threshold, the broadband network 106 may be suitable for communications by the radio device 102 and, when the signal quality of the broadband network 106 is below the given signal quality threshold, the broadband network 106 may not be suitable for communications by the radio device 102. For LTE networks, and the like, one example of signal quality that may be determined is Reference Signal Received Quality (RSRQ), and a given RSRQ threshold may be provided.

Hence, a condition of the broadband network 106 that is determined by the radio device 102 may depend on a type of the broadband network 106.

Furthermore, while "suitable" and/or "suitable communications" are relative terms, it is understood that the various given thresholds may be based on measured error rates in communications above and below the a given threshold, and/or that a given threshold may be determined heuristically.

Hence, the radio device 102 may be generally configured to: in response to conditions of the broadband network 106 meeting given conditions and further in response to receiving the access criteria 118, when the radio device 102 is already communicating on the broadband network 106, continue to communicate on the broadband network 106; and when the radio device 102 was communicating on the narrowband network 104, or attempting to register with the narrowband network site 108, switch from communicating on the narrowband network 104, or attempting to register with the narrowband network site 108, to communicating on the broadband network 106.

Further details of the radio device 102 determining over which of the networks 104, 106 to communicate are described in more detail below.

Figure 2:
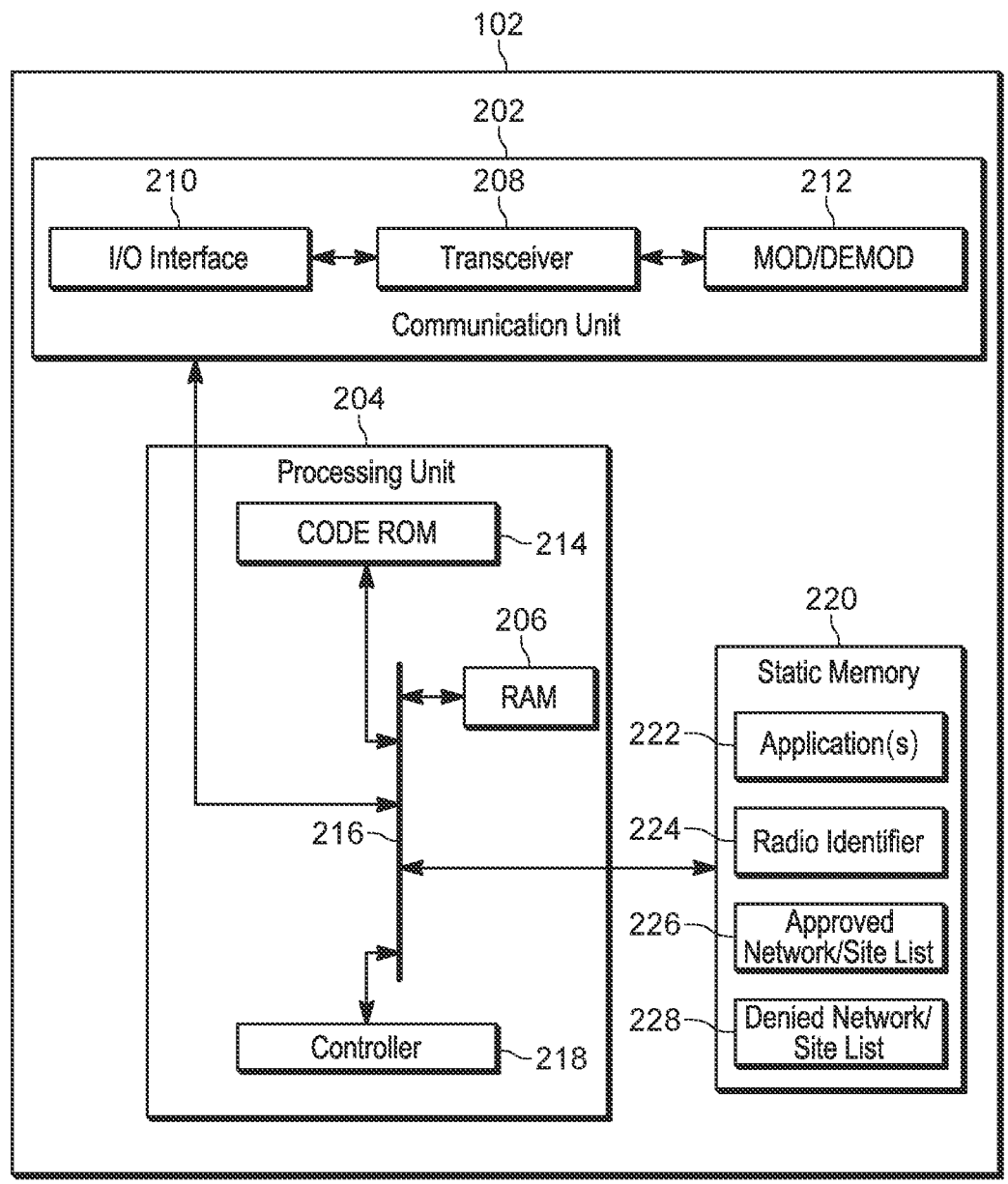
FIG. 2 is a device diagram showing a device structure of a radio device for switching between a narrowband network and a broadband network, in accordance with some examples.

Attention is next directed to FIG. 2, which depicts a schematic block diagram of an example of the radio device 102.

As depicted, the radio device 102 comprises: a communication unit 202 configured to communicate via the narrowband network 104 and the broadband network 106, a processing unit 204, a Random-Access Memory (RAM) 206, wireless transceivers 208, one or more wireless input/output (I/O) interfaces 210, a combined modulator/demodulator 212, a code Read Only Memory (ROM) 214, a common data and address bus 216, a controller 218, and a static memory 220 storing at least one application 222. The controller 218 is understood to be communicatively connected to other components of the radio device 102 via the common data and address bus 216. Hereafter, the at least one application 222 will be interchangeably referred to as the application 222.

Furthermore, while the memories 206, 214 are depicted as having a particular structure and/or configuration, (e.g., separate RAM 206 and ROM 214), memory of the radio device 102 may have any suitable structure and/or configuration.

While not depicted, the radio device 102 may include one or more of an input device, a display screen, and the like.

As shown in FIG. 2, the radio device 102 includes the communication unit 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication unit 202 may include one or more wired and/or wireless input/output (I/O) interfaces 210 that are configurable to communicate with the other components of the system 100. For example, the communication unit 202 may include suitable numbers of wireless transceivers 208 for communicating with other suitable components of the system 100 including the network sites 108, 110. For example the transceivers 208 may include a narrowband transceiver for communicating with the narrowband network site 108, and a broadband transceiver for communicating with the broadband network site 110.

Hence, the transceivers 208 may be adapted for communication with communication links and/or communication networks used to communicate with the other components of the system 100 including the network sites 108, 110, and the narrowband network 104 and the broadband network 106. For example, the transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3rd Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network.

Hence, the transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

A transceiver 208 may also be coupled to a combined modulator/demodulator 212.

However, the communication unit 202 may further include one or more transceivers that are wireline transceivers, such as an Ethernet transceiver, a USB (Universal Serial Bus) transceiver, or similar transceiver configurable to communicate via a twisted pair wire, a coaxial cable, a fiber-optic link, or a similar physical connection to a wireline network.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the radio device 102 is not a generic controller and/or a generic device, but a device specifically configured to implement functionality for switching between a narrowband network and a broadband network. For example, in some examples, the radio device 102 and/or the controller 218 specifically comprises a computer executable engine configured to implement functionality for switching between a narrowband network and a broadband network.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the radio device 102 as described herein are maintained, persistently, at the memory 220 and used by the controller 218, which makes appropriate utilization of volatile storage during the execution of such programming instructions.

Figure 3:
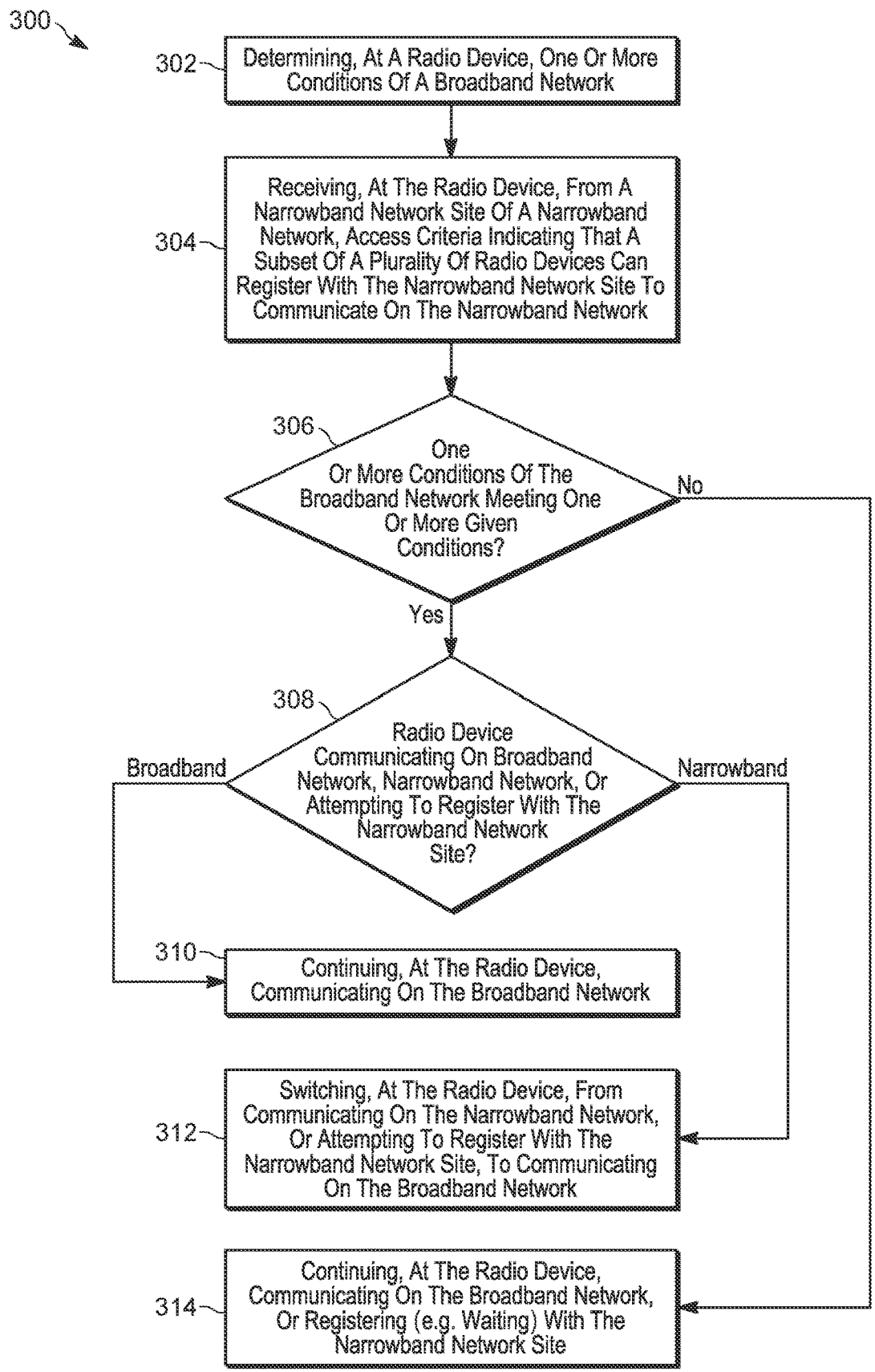
FIG. 3 is a flowchart of a method for switching between a narrowband network and a broadband network, in accordance with some examples.

Furthermore, the memory 220 stores instructions corresponding to the at least one application 222 that, when executed by the controller 218, enables the controller 218 to implement functionality for switching between a narrowband network and a broadband network, including but not limited to, the blocks of the method set forth in FIG. 3.

As depicted, the memory 220 further stores an identifier 224 of the radio device 102 (e.g., "Radio Identifier") that may comprise a DMR and/or LMR radio identifier, and the like, though other suitable identifiers are within the scope of the present specification including, but not limited to, an International Mobile Equipment Identity (IMEI) identifier, an International Mobile Subscriber Identity (IMSI), a media access control (MAC) address, a phone number, and/or any suitable identifier that may identify the radio device 102 to the narrowband network site 108, and which may be used to invite the radio device 102 to register with narrowband network site 108. However, generally, IMEI identifiers, IMSI identifiers, MAC addresses phone numbers, and the like may be more typically used to register with broadband network sites rather than narrowband network sites. In some of these examples, the identifier 224 may alternatively be stored on a subscriber identity module (SIM) card (not depicted).

As depicted, the memory 220 may further store an approved network/site list 226 comprising one or more identifiers of one or more broadband networks and/or one or more broadband network sites with which the radio device 102 has been approved to communicate. For example, the list 226 may include identifiers for cell networks (e.g., LTE networks), WiFi networks, and the like, on which the radio device 102 has been approved to communicate (e.g., by an agency, such as a police force, associated with the radio device 102), cell network sites and/or WiFi sites thereof. In examples described herein, the approved network/site list 226 may identify the broadband network 106 and/or the broadband network site 110. In particular examples, the approved network/site list 226 may include, but are not limited to, LTE network identifiers and/or Public land mobile network (PLMN) identifier and/or WiFi network identifiers, and the like.

As depicted, the memory 220 may further store a denied network/site list 228 comprising one or more identifiers of one or more broadband networks and/or one or more broadband network sites with which the radio device 102 has been denied to communicate. For example, the list 228 may include identifiers of cell networks (e.g., LTE networks), WiFi networks, and the like, on which the radio device 102 has been denied to communicate (e.g., by an agency, such as a police force, associated with the radio device 102), cell network sites and/or WiFi sites thereof. In particular examples, the denied network/site list 228 may include, but are not limited to, LTE network identifiers and/or Public land mobile network (PLMN) identifiers and/or WiFi network identifiers, and the like.

In illustrated examples, when the controller 218 executes the one or more applications 222, the controller 218 is enabled to: determine one or more conditions of a broadband network; receive, from a narrowband network site of a narrowband network, access criteria indicating that a subset of a plurality of radio devices can register with the narrowband network site to communicate on the narrowband network; and in response to the one or more conditions of the broadband network meeting one or more given conditions and receiving the access criteria: when the radio device is already communicating on the broadband network, continue communicating on the broadband network; or when the radio device is communicating on the narrowband network, or attempting to register with the narrowband network site, switch, at the radio device, from communicating on the narrowband network, or attempting to register with the narrowband network site, to communicating on the broadband network.

While details of the other radio devices 112 are not depicted, the other radio devices 112 may have components similar to the radio device 102 adapted, however, for the respective functionality thereof. However, one or more of the other radio devices 112 may have similar functionality as the radio device 102, as described herein. While details of the gateway 114 and the call server 116 are not depicted, the gateway 114 and the call server 116 may have components similar to the radio device 102 adapted, however, for the respective functionality thereof and/or in a server and/or cloud computing device format. For example, the gateway 114 may be generally adapted to translate between a narrowband PTT protocols (such as P25) and a broadband PTT standard protocols (such as OMA-PoC). The call server 116 may be generally adapted to maintain floor control in an OMA-PoC session and/or otherwise controls communications between two or more radio devices, such as two or more of the radio devices 102, 112, when at least one of the radio devices is communicating via the broadband network 106.

Attention is now directed to FIG. 3, which depicts a flowchart representative of a method 300 for switching between a narrowband network and a broadband network. The operations of the method 300 of FIG. 3 correspond to machine readable instructions that are executed by the radio device 102, and specifically the controller 218 of the radio device 102. In the illustrated example, the instructions represented by the blocks of FIG. 3 are stored at the memory 220 for example, as the application 222. The method 300 of FIG. 3 is one way that the controller 218 and/or the radio device 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 218 and/or the radio device 102 determines one or more conditions of the broadband network 106.

In some examples, the one or conditions of the broadband network 106 may comprise one or more of a signal strength of the broadband network 106, a signal quality of the broadband network 106, a Reference Signal Received Power (RSRP) of the broadband network 106, a Received Signal Strength Indicator (RSSI) of the broadband network 106, a Reference Signal Received Quality (RSRQ) of the broadband network 106 and an identifier of one or more of the broadband network 106 and the broadband network site 110.

Furthermore, it is understood that a determined condition may depend on a type of the broadband network 106. For example, when the broadband network 106 comprises an LTE network, the one or conditions of the broadband network 106 may comprise one or more of a signal strength of the broadband network 106, a signal quality of the broadband network 106, a Reference Signal Received Power (RSRP) of the broadband network 106, a Reference Signal Received Quality (RSRQ) of the broadband network 106 and an identifier of one or more of the broadband network 106 and the broadband network site 110. However, when the broadband network 106 comprises a WiFi LTE network, the one or conditions of the broadband network 106 may comprise one or more of a signal strength of the broadband network 106, a Received Signal Strength Indicator (RSSI) of the broadband network 106, and an identifier of one or more of the broadband network 106 and the broadband network site 110

Hence, it is understood that, in some examples, the controller 218 and/or the radio device 102 is configured to measure signal strengths and/or signal quality of networks, which may include, but is not limited to a signal strength of either of the networks 104, 106, such as a signal strength of a signal broadcast by the respective sites 108, 110. Furthermore, in some examples, the controller 218 and/or the radio device 102 may determine respective identifiers of the networks 104, 106 and/or the sites 108, 110, via such respective identifiers being broadcast by the sites 108, 110.

At a block 304, the controller 218 and/or the radio device 102 receives (e.g., via the communication unit 202), from the narrowband network site 108 of the narrowband network 104, the access criteria 118 indicating that a subset of the plurality of radio devices 102, 112 can register with the narrowband network site 108 to communicate on the narrowband network 104, the subset including the radio device 102.

In the access criteria 118 generally comprises an indication of identifiers of the subset of the plurality of radio devices 102, 112 that can register with the narrowband network site 108 to communicate on the narrowband network 104. The identifiers of the subset of the plurality of radio devices 102, 112 may be indicated in any suitable manner, which may include, but is not limited to, criteria that defines given aspects of the identifiers, such as even identifiers, or odd identifiers, or a given number of bits (e.g., a mask length) of a given mask pattern (e.g., in DMR trunking), or any other suitable criteria. With regards to a DMR, the access criteria 118 the subset of the plurality of radio devices 102, 112 indicated by the access criteria 118 may comprise all of the plurality of radio devices 102, 112 when the given number of bits (e.g., a mask length) of the given mask pattern the mask length is 0 (e.g., which is equivalent to no mask). Hence, the subset of the plurality of radio devices 102, 112 indicated by the access criteria 118 may comprise fewer than all of the plurality of radio devices 102, 112, or all of the plurality of radio devices 102, 112.

Furthermore, in some examples, the subset may include the radio device 102 while in other examples the subset may exclude the radio device 102. For example, an identifier of the radio device 102 may meet the access criteria 118 or the identifier of the radio device 102 may not meet the access criteria 118. Returning to the mask example, an identifier of the radio device 102 may end in "00" (in binary), and the access criteria 118 may comprise a given number of bits (e.g., a mask size) of "2" of a mask pattern of "0b 0000 0000 0000 0000 0000 0000" (in binary) thereby including the radio device 102; conversely an identifier of the radio device 102 may end in "00" (in binary), and the access criteria 118 may comprise a given number of bits (e.g., a mask size) of "2" of a mask pattern of "0b 0000 0000 0000 0000 0000 0001" (in binary) thereby excluding the radio device 102.

At a block 306, the controller 218 and/or the radio device 102 determines whether the one or more conditions of the broadband network 106 (e.g., as determined at the block 302) meet one or more given conditions.

In particular, the one or more given conditions may depend on which of one or more conditions of the broadband network 106 were determined at the block 302. For example, the one or more given conditions may comprise one or more of:

The signal strength of the broadband network 106 being above the given signal strength threshold, described herein.

The signal quality of the broadband network 106 being above a given signal quality threshold, described herein.

An RSRP of the broadband network 106 being above a given RSRP threshold, described herein.

the RSSI of the broadband network 106 being above a given RSSI threshold, described herein.

the RSRQ of the broadband network 106 being above a given RSRQ threshold, described herein.

An identifier of one or more of the broadband network 106 and the broadband network site 110 being on the approved list 226.

An identifier of one or more of the broadband network 106 and the broadband network site 110 not being on the denied list 228. In some examples, when the identifier of one or more of the broadband network 106 and the broadband network site 110 is not on the denied list 228, and not on the approved list 226, the controller 218 and/or the radio device 102 may determine that the one or more given conditions are met at the block 306.

In response to one more of the conditions of the broadband network 106 meeting one or more of the given conditions and receiving the access criteria 118 (e.g., a "YES" decision at the block 306), at a block 308 the controller 218 and/or the radio device 102 determines whether the radio device 102 is already communicating on the broadband network 106, or whether the radio device 102 is communicating on the narrowband network 104, or is attempting to register with the narrowband network site 108.

When the radio device 102 is already communicating on the broadband network 106, at a block 310, the controller 218 and/or the radio device 102 continues communicating on the broadband network 106 (e.g., via the communication unit 202).

When the radio device 102 is communicating on the narrowband network 104, or is attempting to register with the narrowband network site 108, at a block 312, the controller 218 and/or the radio device 102 switches from communicating on the narrowband network 104, or attempting to register with the narrowband network site 108, to communicating on the broadband network 106 (e.g., via the communication unit 202).

In some of these examples, at the block 312, the method 300 may further comprise the controller 218 and/or the radio device 102 switching from communicating on the narrowband network 104 to communicating on the broadband network 106 after a given dwell time during which the radio device 102 was communicating on the narrowband network 104; such a dwell time is understood to define a minimum time that a radio device is to spend on a network before switching to another network to prevent a radio device from rapidly and constantly switching between networks which may interrupt communications with other radio devices. Any suitable dwell time is within the scope of the present specification including, but not limited to, 10 seconds.

Returning to the block 306, in response to the one or more conditions of the broadband network 106 not meeting the one or more given conditions (e.g., none of the given conditions are met, and assuming the access criteria 118 has been received) (e.g., a "NO" decision at the block 306), at a block 314 the controller 218 and/or the radio device 102 may continue to communicate with the narrowband network 104, or attempt to register with the narrowband network site 108, even when the radio device 102 has to make multiple attempts to register and/or wait for further access criteria, and the like.

The method 300 may include other suitable features to switch between the networks 104, 106.

For example, when the radio device 102 is communicating on the narrowband network 104 or is attempting to register with the narrowband network site 108, for example due to implementation of the block 314, and the like, and/or at any other given time, the method 300 may further include the controller 218 and/or the radio device 102 switching from communicating on the narrowband network 104, or attempting to register with the narrowband network site 108, to communicating on the broadband network 106 further in response to the one or more conditions of the broadband network 106 meeting the one or more given conditions (e.g., as described with reference to the block 306), and one or more of:

- Being denied registration at the narrowband network site 108. In such an example, a message received at the radio device 102 from the narrowband network site 108 is understood to be different from the access criteria 118 (e.g., which may invite the radio device 102 to register); rather such a message may specifically deny the radio device 102 from registering.
- Determining that the narrowband network site 108 is busy. In such an example, a message received at the radio device 102 from the narrowband network site 108 is understood to be different from the access criteria 118 (e.g., which may invite the radio device 102 to register); rather such a message may indicate that the narrowband network site 108 is busy. In particular, the narrowband network site 108 being busy may be indicated by no idle and/or free traffic channel resources being available via the narrowband network site 108.
- Determining a talkgroup affiliation failure on the narrowband network 104. In such an example, the radio device 102 may attempt to affiliate with a talkgroup, including, but not limited to, a primary talkgroup, and a failure to affiliate may be indicated by one or more of: no response being received from the narrowband network 104 (e.g., the narrowband network site 108) to an affiliation request transmitted by the radio device 102; an affiliation failure message and/or denial message being received from the narrowband network 104 (e.g., the narrowband network site 108), and the like.
- Losing communication with the control channel 120 on the narrowband network 104. For example, data and/or signals on the control channel 120 may stop and/or may not be received at the radio device 102 due to a failure of the control channel 120 and/or a signal strength of the control channel 120 falling below certain signal strengths.
- Determining that the control channel 120 comprises a shared control channel. In some examples, the radio device 102 may store data (e.g., at the application 222 and/or separate from the application 222) at the memory 220 indicating whether the control channel 120 is a dedicated control channel or a shared control channel, such that determining that the control channel 120 comprises a shared control channel comprises retrieving such data from the memory 220. Alternatively, data received on the control channel 120 at the radio device 102 may indicate that the control channel 120 is shared, enabling the radio device 102 to determine that the control channel 120 is shared. In either example, when the control channel 120 is shared, it is understood that bandwidth and/or frequencies of the control channel 120 may be shared with other communication networks.
- Determining that there is no active connection on the narrowband network 104. For example, as depicted there is a communication link between the narrowband network site 108 and the narrowband network 104 which may represent an active connection between the narrowband network site 108 and the narrowband network 104. In some examples such an active connection may not be present and/or may disappear and/or fail (e.g., due to the narrowband network site 108 failing to maintain the connection and the like). In such an example, the radio device 102 may determine that, while there is communication with the narrowband network site 108, there is no communication with the narrowband network 104. Put another way, in these examples, the narrowband network site 108 may be isolated from other the narrowband network sites of the narrowband network 104. Furthermore, in some examples, the narrowband network site 108 may broadcast (e.g., in a message) that an active connection is available which is received by the radio device 102; the radio device 102 may determine that no active connection is available via the narrowband network site 108 when the radio device 102 fails to receive such a broadcast and/or message from the narrowband network site 108.

However, the radio device 102 may switch from communicating on the narrowband network 104, or switch from attempting to register with the narrowband network site 108, to communicating on the broadband network 106 under any other suitable conditions, presuming the one or more conditions of the broadband network 106 determined at the block 302 meet one or more of the given conditions described with respect to the block 306.

In other examples, the method 300 may further include the controller 218 and/or the radio device 102: communicating on the broadband network 106; determining one or more respective conditions of the narrowband network 104; and switching from communicating on the broadband network 106 to communicating on the narrowband network 104 in response to the one or more respective conditions of the narrowband network 104 meeting one or more respective given conditions. These examples assume that the radio device 102 is communicating on the broadband network 106, for example due to implementation of the block 310 and/or the block 312 and/or at any other suitable time.

Furthermore, the one or more respective conditions of the narrowband network 104 determined by the radio device 102 may comprise one or more of a signal strength of the narrowband network 104, and an identifier of one or more of the narrowband network 104 and the narrowband network site 108, and the one or more given conditions may respectively comprise one or more of: the signal strength of the narrowband network 104 being above a given signal strength threshold; the identifier of one or more of the narrowband network 104 and the narrowband network site 108 being on the approved list 226; the identifier of one or more of the narrowband network 104 and the narrowband network site 108 not being on the denied list 228, and the like.

However, in these examples, the controller 218 and/or the radio device 102 switching from communicating on the broadband network 106 to communicating on the narrowband network 104 may occur in response to one or more of the respective conditions of the narrowband network 104 meeting one or more respective given conditions, and one or more of:

- Determining that the broadband network 106 goes down. For example, the broadband network 106 may (e.g., temporarily) stop operations and while a wireless communication link between the radio device 102 and the broadband network site 110 may be established, no access to the broadband network 106 may be provided, indicating to the radio device 102 that the broadband network 106 is down.

Determining that there is no active connection with the broadband network 106, similar to as described above with respect to an active connection with the narrowband network 104.

Determining that there is no connection to the Internet on the broadband network 106. For example, the broadband network 106 may be communicating with other broadband networks that form at a least a part of the Internet, but such communication may fail. The radio device 102 may determine such a failure by attempting to communicate on the Internet via broadband network 106 and failing. In particular, the call server 116 may be connected to the broadband network 106 via the Internet; hence, there is no connection to the Internet on the broadband network 106, the radio device 102 may not be able to communicate with the call server 116 for setting up or receiving calls and messages, and the like.

Losing a connection with the call server 116 on the broadband network 106, the call server 116 to coordinate one or more of calls and messages between the broadband network 106 and the narrowband network 104, as previously described. For example, the radio device 102 may have established a connection with the call server 116 (e.g., under the OMA-PoC broadband wireless application and/or standard) which may be lost due the call server 116 going down, and the like. In such examples, the radio device 102 may determine that a connection to the call server 116 is lost due to a failure by the call server 116 to respond to signaling messages from the radio device 102.

Determining that the call server 116 is unavailable. For example, the radio device 102 may receive a message from the call server 116 indicating that the call server 116 is unavailable.

Determining that the radio device 102 is logged out of the call server 116. For example, the radio device 102, in order to use the call server 116, may need to log into the call server 116 using preconfigured credentials. When the radio device 102 has not yet logged in the radio device 102 may determine that the radio device 102 is logged out of the call server 116. Alternatively, and/or in addition, the call server 116 may log the radio device 102 out of the call server 116 and transmit a corresponding message to the radio device 102.

Determining that the gateway 114 between the broadband network 106 and the narrowband network 104 is unavailable For example, the radio device 102 may receive a message from the gateway 114 (e.g., via the narrowband network 104 or the broadband network 106, and/or sites 108, 110 thereof) indicating that the gateway 114 is unavailable, and/or communication with the broadband network 106 via the gateway 114 may fail.

In some particular examples, the method 300 may further include the controller 218 and/or the radio device 102: communicating on the broadband network 106; determining that the signal strength of the narrowband network 104 is above a given signal strength threshold; receiving, from the narrowband network site 108, the access criteria 118; and switching from communicating on the broadband network 106 to communicating on the narrowband network 104 when further access criteria is received from the narrowband network site 108 indicating that all the radio devices 102, 112 can register on the narrowband network 104, and not just the subset indicated by the access criteria 118. Put another way, in these examples, the radio device 102 may have switched to communicating on the broadband network 106, and may later switch to communicating on the narrowband network 104 when the narrowband network site 108 broadcasts further access criteria indicating that all and/or any of the radio devices 102, 112 (e.g., or any other radio devices) may register to communicate on the narrowband network 104 via the narrowband network site 108. Such an example may further include the controller 218 and/or the radio device 102 confirming there is an active connection between the narrowband network site 108 and the narrowband network 104 before switching from communicating on the broadband network 106 to communicating on the narrowband network 104.

Figure 4:
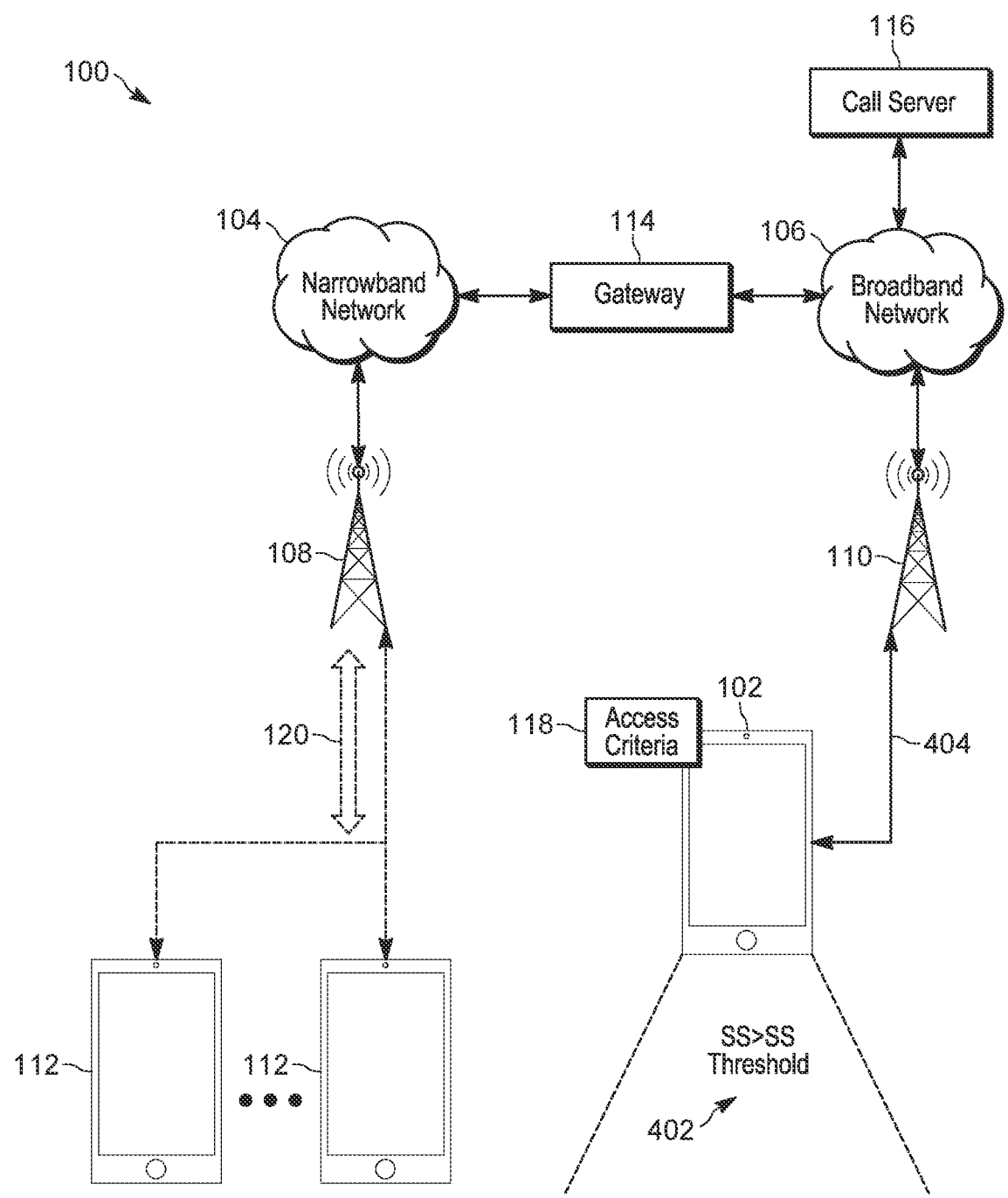
FIG. 4 depicts the system of FIG. 1, implementing aspects of a method for switching between a narrowband network and a broadband network, according to some examples.

Attention is next directed to FIG. 4 which depicts aspects of the method 300. FIG. 4 is similar to FIG. 1 with like components having like numbers.

As depicted the radio device 102 has made a determination 402 (e.g., at the block 302 of the method 300), that a signal strength (e.g., "SS") of the broadband network 106 (e.g., and/or the broadband network site 110) is above a given signal strength threshold (e.g., "SS Threshold"). For illustrative purposes, the determination 402 is depicted adjacent the radio device 102 however the dashed lines extending from the radio device 102 to the determination 402 are to indicate that the determination 402 is made at the radio device 102. Alternatively, the determination 402 may be based on signal quality, RSRP, RSSI, and/or RSRQ, and respective given thresholds.

As depicted, the radio device 102 has further received the access criteria 118 that indicates that a subset of the plurality of radio devices 102, 112 can register with the narrowband network site 108, the subset including the radio device 102. However, the radio device 102 declines to register with the narrowband network site 108 and communicates with the broadband network 106 instead, for example by establishing a communication link 404 with the broadband network site 110. For example, comparing FIG. 4 with FIG. 1, a communication link between the radio device 102 and the broadband network site 110 is depicted in solid lines, indicating that the radio device 102 has continued communicating with the broadband network 106 (e.g., at the block 310 of the method 300), or has switched from communicating on the narrowband network 104 to communicating on the broadband network 106 (e.g., at the block 310 of the method 300). In particular, comparing FIG. 4 with FIG. 1 there may be no communication link between the radio device 102 and the narrowband network site 108, at least temporarily, and/or until the radio device 102 later make a determination whether to switch from communicating on the broadband network 106 to communicating on narrowband network 104.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, control call handling equipment, and the like).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   determining, at a radio device, one or more conditions of a broadband network;
   receiving, at the radio device, from a narrowband network site of a narrowband network, access criteria indicating that a subset of a plurality of radio devices can register with the narrowband network site to communicate on the narrowband network; and
   in response to the one or more conditions of the broadband network meeting one or more given conditions and receiving the access criteria:
      when the radio device is communicating on the broadband network, continuing, at the radio device, communicating on the broadband network; and
      when the radio device is communicating on the narrowband network, or attempting to register with the narrowband network site, switching, at the radio device, from communicating on the narrowband network, or attempting to register with the narrowband network site, to communicating on the broadband network.

2. The method of claim 1, further comprising:
   switching, at the radio device, from communicating on the narrowband network, or attempting to register with the narrowband network site, to communicating on the broadband network, further in response to the one or more conditions of the broadband network meeting the one or more given conditions and one or more of:
   being denied registration at the narrowband network site;
   determining that the narrowband network site is busy;
   determining a talkgroup affiliation failure on the narrowband network;
   losing communication with a control channel on the narrowband network;
   determining that the control channel comprises a shared control channel; and
   determining that there is no active connection on the narrowband network.

3. The method of claim 1, further comprising:
   communicating, at the radio device, on the broadband network;
   determining, at the radio device, one or more respective conditions of the narrowband network; and
   switching, at the radio device, from communicating on the broadband network to communicating on the narrowband network in response to the one or more respective conditions of the narrowband network meeting one or more respective given conditions and one or more of:
   determining that the broadband network goes down;
   determining that there is no active connection with the broadband network;
   determining that there is no connection to the Internet on the broadband network;
   losing a connection with a call server on the broadband network, the call server to coordinate one or more of calls and messages between the broadband network and the narrowband network;
   determining that the call server is unavailable;
   determining that the radio device is logged out of the call server; and
   determining that a gateway between the broadband network and the narrowband network is unavailable.

4. The method of claim 1, wherein the narrowband network comprises one or more of a digital mobile radio network and a land mobile radio network.

5. The method of claim 1, wherein the broadband network comprises one or more of a cell phone network, an LTE (Long Term Evolution) network, a 5G network, and a WiFi network.

6. The method of claim 1, wherein:
   the one or more conditions of the broadband network comprising one or more of a signal strength of the broadband network, a signal quality of the broadband network, a Reference Signal Received Power (RSRP) of the broadband network, a Received Signal Strength Indicator (RSSI) of the broadband network, a Reference Signal Received Quality (RSRQ) of the broadband network, an identifier of one or more of the broadband network and a broadband network site, and
   the one or more given conditions respectively comprise one or more of:
      the signal strength of the broadband network being above a given signal strength threshold;
      the signal quality of the broadband network being above a given signal quality threshold;
      the RSRP of the broadband network being above a given RSRP threshold;
      the RSSI of the broadband network being above a given RSSI threshold;
      the RSRQ of the broadband network being above a given RSRQ threshold;
      the identifier being on an approved list; and
      the identifier not being on a denied list.

7. The method of claim 1, further comprising switching, at the radio device, from communicating on the narrowband network to communicating on the broadband network after a given dwell time during which the radio device was communicating on the narrowband network.

8. The method of claim 1, wherein the access criteria comprises an indication of identifiers of the subset of the plurality of radio devices can register with the narrowband network site to communicate on the narrowband network.

9. The method of claim 1, further comprising:
   communicating, at the radio device, on the broadband network;
   determining, at the radio device, that a signal strength of the narrowband network is above a given signal strength threshold;
   receiving, at the radio device, from the narrowband network site, the access criteria; and
   switching, at the radio device, from communicating on the broadband network to communicating on the narrowband network when further access criteria is received from the narrowband network site indicating that all the radio devices can register on the narrowband network, and not just the subset.

10. The method of claim 1, wherein the subset includes the radio device or the subset excludes the radio device.

11. A radio device comprising:
    a communication unit configured to communicate over a narrowband network and a broadband network; and
    a controller configured to:
    determine one or more conditions of the broadband network;
    receive, via the communication unit, from a narrowband network site of the narrowband network, access criteria indicating that a subset of a plurality of radio devices can register with the narrowband network site to communicate on the narrowband network; and in response to the one or more conditions of the broadband network meeting one or more given conditions and receiving the access criteria:

when the radio device is communicating on the broadband network, continue communicating on the broadband network via the communication unit; and when the radio device is communicating on the narrowband network, or attempting to register with the narrowband network site, switch from communicating on the narrowband network, or attempting to register with the narrowband network site, to communicating on the broadband network via the communication unit.

12. The radio device of claim 11, wherein the controller is further configured to:

switch from communicating on the narrowband network, or attempting to register with the narrowband network site, to communicating on the broadband network, further in response to the one or more conditions of the broadband network meeting the one or more given conditions and one or more of:

being denied registration at the narrowband network site;

determining that the narrowband network site is busy;

determining a talkgroup affiliation failure on the narrowband network;

losing communication with a control channel on the narrowband network;

determining that the control channel comprises a shared control channel; and determining that there is no active connection on the narrowband network.

13. The radio device of claim 11, wherein the controller is further configured to:

communicate, at the radio device, on the broadband network;

determine one or more respective conditions of the narrowband network; and switch from communicating on the broadband network to communicating on the narrowband network in response to the one or more respective conditions of the narrowband network meeting one or more respective given conditions and one or more of:

determining that the broadband network goes down;

determining that there is no active connection with the broadband network;

determining that there is no connection to the Internet on the broadband network;

losing a connection with a call server on the broadband network, the call server to coordinate one or more of calls and messages between the broadband network and the narrowband network;

determining that the call server is unavailable;

determining that the radio device is logged out of the call server; and determining that a gateway between the broadband network and the narrowband network is unavailable.

14. The radio device of claim 11, wherein the narrowband network comprises one or more of a digital mobile radio network and a land mobile radio network.

15. The radio device of claim 11, wherein the broadband network comprises one or more of a cell phone network, an LTE (Long Term Evolution) network, a 5G network, and a WiFi network.

16. The radio device of claim 11, wherein:

the one or more conditions of the broadband network comprise one or more of a signal strength of the broadband network, a signal quality of the broadband network, a Reference Signal Received Power (RSRP) of the broadband network, a Received Signal Strength Indicator (RSSI) of the broadband network, a Reference Signal Received Quality (RSRQ) of the broadband network, an identifier of one or more of the broadband network and a broadband network site, and the one or more given conditions respectively comprise one or more of:

the signal strength of the broadband network being above a given signal strength threshold;

the signal quality of the broadband network being above a given signal quality threshold;

the RSRP of the broadband network being above a given RSRP threshold;

the RSSI of the broadband network being above a given RSSI threshold;

the RSRQ of the broadband network being above a given RSRQ threshold;

the identifier being on an approved list; and the identifier not being on a denied list.

17. The radio device of claim 11, wherein the controller is further configured to switch from communicating on the narrowband network to communicating on the broadband network after a given dwell time during which the radio device was communicating on the narrowband network.

18. The radio device of claim 11, wherein the access criteria comprises an indication of identifiers of the subset of the plurality of radio devices can register with the narrowband network site to communicate on the narrowband network.

19. The radio device of claim 11, wherein the controller is further configured to:

communicate on the broadband network;

determine that a signal strength of the narrowband network is above a given signal strength threshold;

receive, from the narrowband network site, the access criteria; and switch from communicating on the broadband network to communicating on the narrowband network when further access criteria is received from the narrowband network site indicating that all the radio devices can register on the narrowband network, and not just the subset.

20. The radio device of claim 11, wherein the subset includes the radio device or the subset excludes the radio device.

* * * * *